(12) United States Patent
Wang et al.

(10) Patent No.: US 11,567,471 B2
(45) Date of Patent: Jan. 31, 2023

(54) DIGITAL RESOLVER DECODER WITH HARDWARE FILTER AND RECTIFIER

(71) Applicant: STMicroelectronics (China) Investment Co., Ltd., Shanghai (CN)

(72) Inventors: Jian Wang, Shanghai (CN); Luting Ye, Shanghai (CN); Xiaobo Sun, Shanghai (CN)

(73) Assignee: STMicroelectronics (China) Investment Co., Shanghai (CN)

( * ) Notice: Subject to any disclaimer, the term of this patent is extended or adjusted under 35 U.S.C. 154(b) by 0 days.

(21) Appl. No.: 17/360,702

(22) Filed: Jun. 28, 2021

(65) Prior Publication Data
US 2022/0413462 A1 Dec. 29, 2022

(51) Int. Cl.
*G05B 19/33* (2006.01)
(52) U.S. Cl.
CPC .... *G05B 19/33* (2013.01); *G05B 2219/41065* (2013.01)
(58) Field of Classification Search
CPC .............. G05B 19/33; G05B 2219/41065
USPC ................. 318/605, 604, 600, 560
See application file for complete search history.

(56) References Cited

U.S. PATENT DOCUMENTS

| 6,754,610 | B2 | 6/2004 | Dudler et al. | |
| 7,508,154 | B1 * | 3/2009 | Labriola, II | ......... H02K 11/225 |
| | | | | 318/432 |
| 8,288,977 | B2 | 10/2012 | Niimi | |
| 9,528,857 | B2 | 12/2016 | Kudlu | |
| 2004/0233078 | A1 | 11/2004 | Takehara | |
| 2012/0143520 | A1 | 6/2012 | Oowada | |
| 2018/0205391 | A1 | 7/2018 | Bird et al. | |
| 2019/0280537 | A1 | 9/2019 | Ikenaga et al. | |

FOREIGN PATENT DOCUMENTS

EP 1471332 A1 10/2004
WO 0231432 A2 4/2002

* cited by examiner

*Primary Examiner* — David Luo
(74) *Attorney, Agent, or Firm* — Slater Matsil, LLP

(57) ABSTRACT

A resolver decoder circuit includes: a first filter circuit configured to calculate a first weighted sum of a first digital signal over a pre-determined period of time, where the first digital signal includes first digital samples of a first analog signal from a sine winding of a resolver; a second filter circuit configured to calculate a second weighted sum of a second digital signal over the pre-determined period of time, where the second digital signal includes second digital samples of a second analog signal from a cosine winding of the resolver, where the first and the second analog signals are configured to be induced by a sine signal applied to an input winding of the resolver; and a rectifier configured to generate a first output and a second output by adjusting a first sign of the first weighted sum and adjusting a second sign of the second weighted sum, respectively.

20 Claims, 9 Drawing Sheets

DIGITAL RESOLVER DECODER WITH HARDWARE FILTER AND RECTIFIER

TECHNICAL FIELD

The present invention relates generally to resolver decoder and in particular, digital resolver decoder with hardware filter and hardware rectifier.

BACKGROUND

Traction motor control is important for electrical vehicle (EV) applications. Axis rotation angle measurement plays a key role in traction motor control. The rotation angle of the motor axis (also referred to as motor shaft) is usually measured by a resolver.

Resolvers, also known as motor resolvers, are electromagnetic transducers that can be used in a wide variety of position and velocity feedback applications, such as servo motor feedback applications. The resolver is a special type of rotary transformer that consists of a cylindrical rotor and stator. The rotor is attached to the motor shaft and rotates with the motor shaft. The resolver typically has a primary winding and two secondary windings. The primary winding may be a rotor winding on the rotor, and the secondary windings may be two stator windings on the stator. The two secondary windings are mechanically arranged such that their physical relation is shifted by a 90° angle.

The resolver is used for generating output signals that indicate the angular position of the motor shaft, with respect to a reference point, within a space of one complete revolution of the motor shaft or within a corresponding angular displacement space from 0° to 360°. To generate the output signals, a rotor excitation signal (e.g., a sine wave signal) is applied at the primary winding. The physical relation of the secondary windings gives rise to a mathematical/electrical relation, such that a first output signal at a first one of the secondary windings is a sine wave signal amplitude-modulated by $\sin(\emptyset)$, and a second output signal at a second one of the secondary windings is a sine wave signal amplitude-modulated by $\cos(\emptyset)$, where $\emptyset$ is the angular position of the motor shaft (may also be referred to as the angle $\emptyset$ of the motor shaft). The resolver output signals are then decoded by a resolver decoder to obtain an estimate of the angle $\emptyset$. There is a need in the art for resolver decoders that provide accurate estimate of the angle $\emptyset$ with lower hardware cost and/or lower computing power requirements.

SUMMARY

In some embodiments, a resolver decoder circuit includes: a first filter circuit configured to calculate a first weighted sum of a first digital signal over a pre-determined period of time, wherein the first digital signal comprises first digital samples of a first analog signal from a first secondary winding of a resolver; a second filter circuit configured to calculate a second weighted sum of a second digital signal over the pre-determined period of time, wherein the second digital signal comprises second digital samples of a second analog signal from a second secondary winding of the resolver, wherein the first analog signal and the second analog signal are configured to be induced by a sine wave signal applied to an input winding of the resolver; and a rectifier configured to generate a first output and a second output by adjusting a first sign of the first weighted sum and adjusting a second sign of the second weighted sum, respectively.

In some embodiments, a processor having an integrated resolver decoder circuit includes: an analog-to-digital converter (ADC) circuit configured to: generate first digital samples by converting a first analog signal from a sine winding of a resolver, and generate second digital samples by converting a second analog signal from a cosine winding of the resolver, the first analog signal and the second analog signal being generated by exciting an input winding of the resolver with a sine wave signal; a first tapped delay line (TDL) filter coupled to the ADC circuit and configured to calculate a first weighted sum of the first digital samples over a pre-determined period of time; a second TDL filter coupled to the ADC circuit and configured to calculate a second weighted sum of the second digital samples over the pre-determined period of time; a rectifier configured to generate a first output and a second output by adjusting a first sign of the first weighted sum and a second sign of the second weighted sum, respectively; and a central processing unit coupled to the rectifier.

In some embodiments, a method of operating a resolver decoder circuit includes: converting a first analog signal from a sine winding of a resolver into first data samples; converting a second analog signal from a cosine winding of the resolver into second data samples; calculating a first weighted sum of the first data samples over a pre-determined period of time; calculating a second weighted sum of the second data samples over the pre-determined period of time; adjusting a first sign of the first weighted sum and a second sign of the second weighted sum based on a location of the pre-determined period of time within a cycle of a sine wave signal; after the adjusting, dividing the first weighted sum by the second weighted sum to obtain a value; and determining an arctangent of the value to obtain an angle.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be re-described in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely digital resolver decoder with hardware filter and hardware rectifier.

Figure 1:
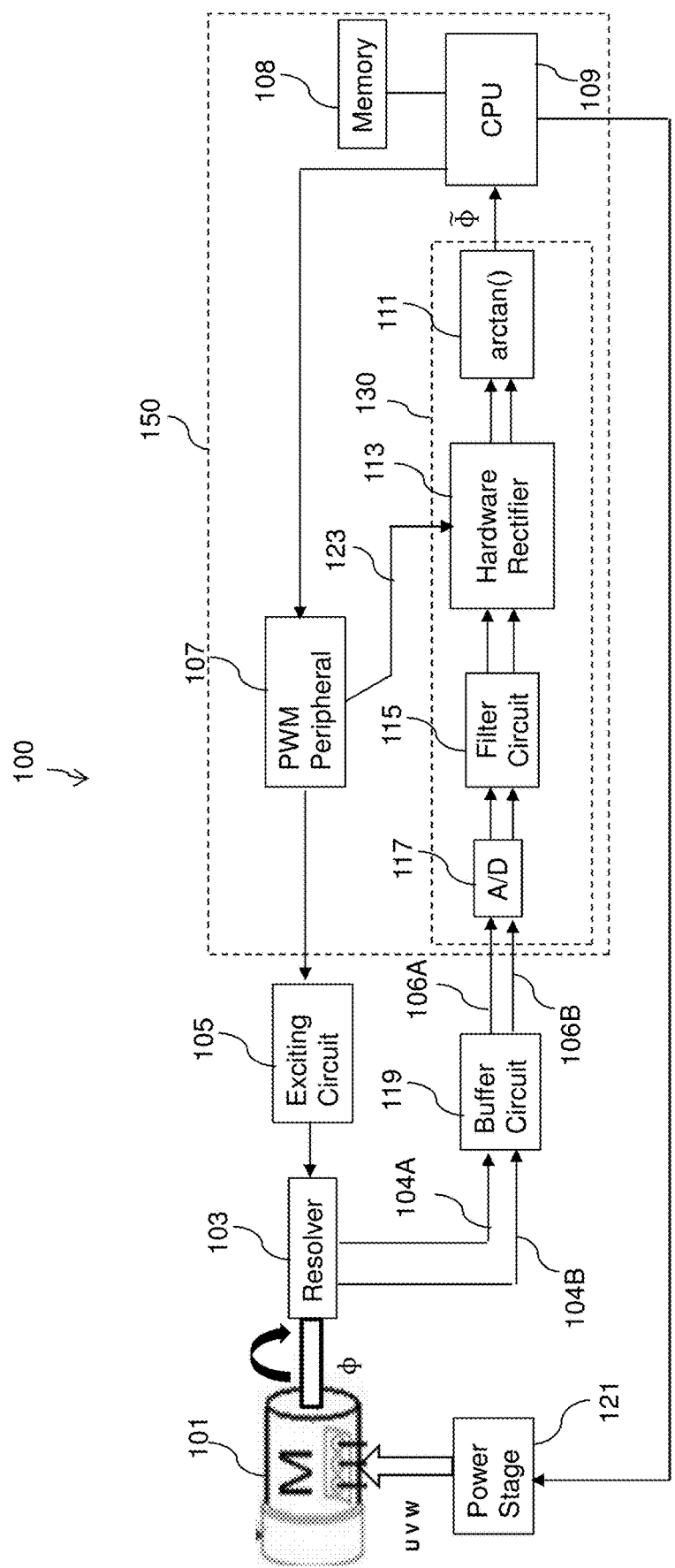
FIG. 1 illustrates a block diagram of a motor system, in an embodiment.

FIG. 1 illustrates a block diagram of a motor system 100, in an embodiment. Note that for simplicity, not all features of the motor system 100 are illustrated.

Referring to FIG. 1, the motor control system 101 includes a motor 101, which may be, e.g., a three-phase motor. The motor 101 is driven by a power stage 121, which may include driver circuits that provide the driving voltages for the motor 101. For example, the power stage 121 may include three parallel driver circuits, each for driving one of the three-phases of the motor 101. Each of the driver circuits may have its respective power switches (e.g., a high-side power switch and a lower-side power switch). The power stage 121 is controlled by a central processing unit (CPU) 109. The CPU 109 has a memory module 108 (e.g., a non-volatile memory). The memory module 108 may store computer programs (e.g. computer codes) for motor control algorithms. In addition, the memory module 108 may store various parameters related to, e.g., system settings, or filter coefficients for a filter circuit 115.

Figure 2:
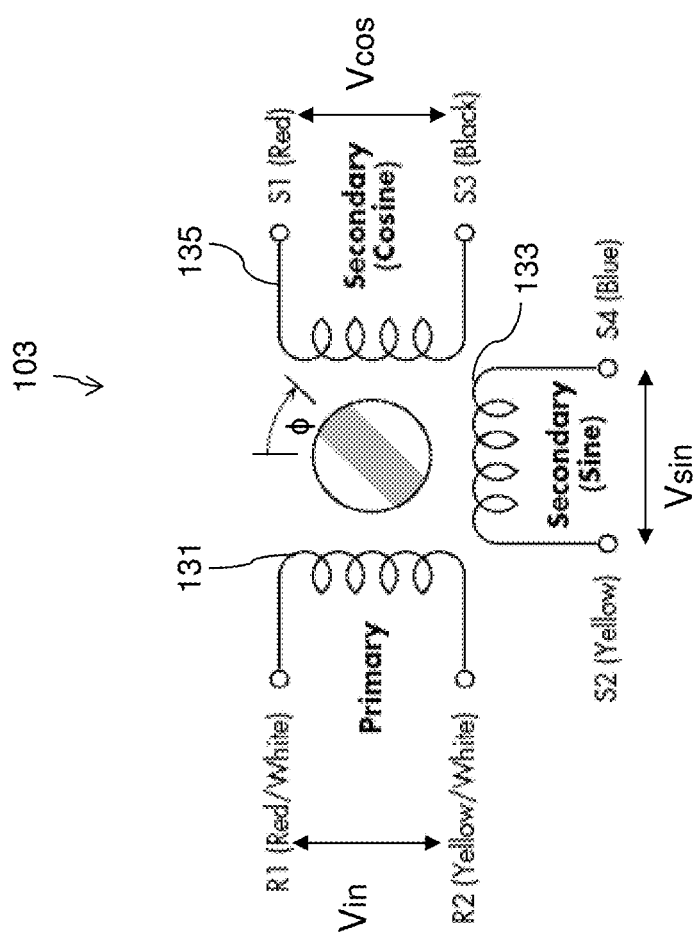
FIG. 2 illustrates the primary winding and secondary windings in a resolver, in an embodiment.
Figure 3:
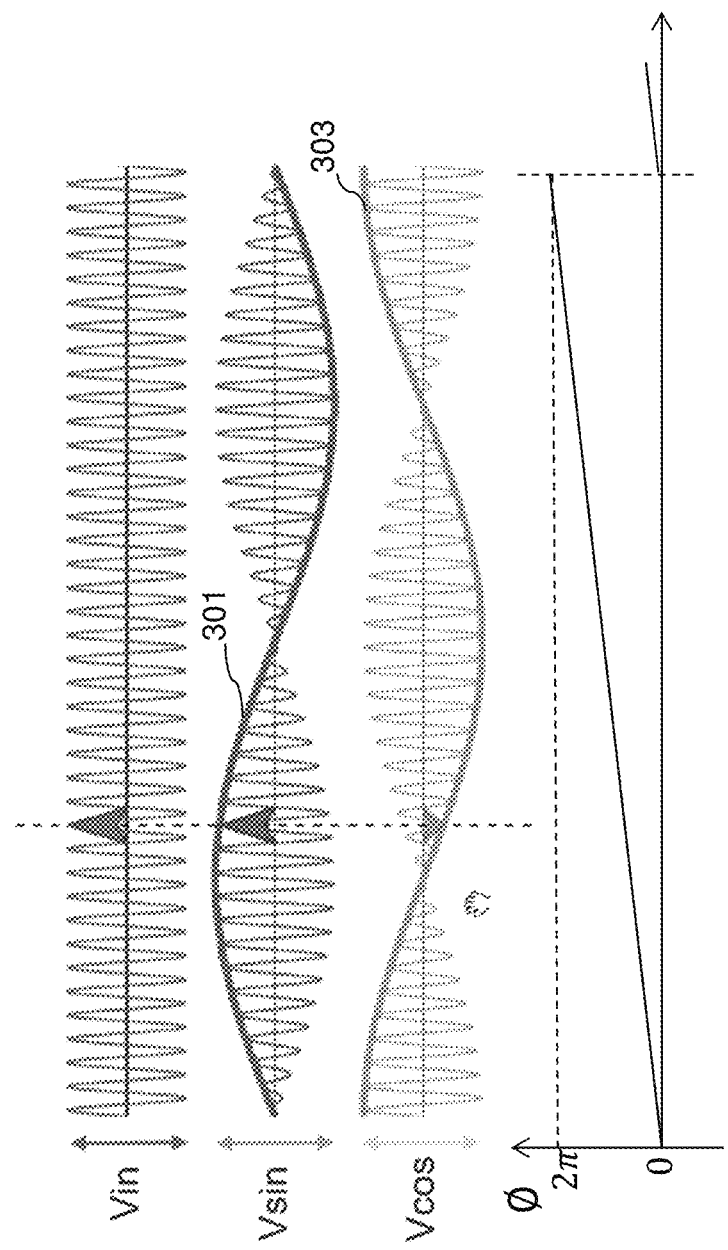
FIG. 3 illustrates the input signal and output signals of a resolver, in an embodiment.

As illustrated in FIG. 1, the rotor of the resolver 103 is coupled to the motor shaft, such that the rotor rotates with the motor shaft. The two secondary windings of the resolver 103 provides two output signals 104A and 104B that can be used to determine the angle Ø of the motor shaft. FIGS. 2 and 3 illustrate details regarding the resolver 103 and the output signals 104A and 104B.

Referring temporarily to FIG. 2, which shows a primary winding 131 of the resolver 103 and two secondary windings of the resolver 103, which secondary windings include a first secondary winding 133 and a second secondary winding 135. The primary winding 131 may be a rotor winding, and the secondary windings 133/135 may be two stator windings. The two secondary windings 133/135 are mechanically arranged such that their coils are shifted by a 90° angle.

The resolver 103 generates output signals at the secondary windings 133/135 by energizing or exciting the primary winding 131 with an excitation voltage $V_{in}$, which is a sine wave signal represented by $V_{in}=A^*\sin(\omega_c t)$, where $\omega_c$ is the angular frequency of the sine wave signal, and A is the amplitude of the sine wave signal. The sine wave signal $V_{in}$ induces a voltage at each of the secondary windings 133/135. The output voltages at the secondary windings 133/135 are amplitude-modulated versions of the sine wave signal $V_{in}$, where the amplitude of the sine wave signal $V_{in}$ is modulated by the sine and cosine of the angle Ø of the motor shaft. For example, a voltage $V_{sin}$ across terminals of the first secondary winding 133 and a voltage $V_{cos}$ across terminals of the second secondary winding 135 may be represented by $$V_{sin}=K^*A^*\sin(\omega_c t)^*\sin(\emptyset) \quad (1)$$

$$V_{cos}=K^*A^*\sin(\omega_c t)^*\cos(\emptyset) \quad (2)$$

where K is the transfer ratio of the resolver 103. The transfer ratio K is a constant for a given resolver 103. Since the output voltage $V_{sin}$ of the first secondary winding 133 is amplitude-modulated by sin(Ø), the first secondary winding 133 is also referred to as the sine winding of the resolver 103. Similarly, the second secondary winding 135 is also referred to as the cosine winding of the resolver 103. In the illustrated example, the output voltage $V_{sin}$ is the output signal 104A in FIG. 1, and the output voltage $V_{cos}$ is the output signal 104B in FIG. 1.

Note that the angle Ø of the motor shaft is actually a time varying signal and may be represented by $\emptyset(t)=\omega_m t$, where om is the angular frequency of the motor shaft. However, the angular frequency $\omega_c$ of the sine wave signal $V_{in}$ is chosen to be much higher than the angular frequency $\omega_m$ of the motor shaft (e.g., $\omega_c \gg \omega_m$), and therefore, during a period T of the sine wave signal ($T=2\pi/\omega_c$), the angle of the motor shaft changes very little and can be considered as a constant. As will be discussed in more details hereinafter, the signal processing of the resolver decoder 130 processes digital samples of output voltages $V_{sin}$ and $V_{cos}$ within one period T (also referred to as a cycle) of the sine wave signal. Therefore, for the purpose of the signal processing performed by the resolver decoder 130, the angle of the motor shaft can be considered as a constant (e.g., constant within each period T), and is denoted as a constant angle Ø in the equations hereinafter to simplify the analysis.

FIG. 3 illustrates the input signal $V_{in}$ and the output signals $V_{sin}$ and $V_{cos}$ of the resolver 103, in an embodiment. In addition, FIG. 3 further illustrates the motor shaft angle Ø that modulates the amplitude of the input signal $V_{in}$. Three subplots at the top of FIG. 3 illustrate signals $V_{in}$, $V_{sin}$, and $V_{cos}$, respectively. The subplot at the bottom of FIG. 3 illustrates the shaft angle Ø. The x-axes of the subplots are aligned and represent time, and the y-axis represents the value of the signals. The curve 301 in FIG. 3 shows that the envelope of the modulated sine wave signal $V_{sin}$ follows the shape of the slow-changing modulating signal sin(Ø). Similarly, the curve 303 in FIG. 3 shows that the envelope of the modulated sine wave signal $V_{cos}$ follows the shape of the slow-changing modulating signal cos(Ø).

Referring back to FIG. 1, the excitation voltage $V_{in}$ is generated by an exciting circuit 105, which may be or include a low-pass filter. The exciting circuit 105 accepts as input a pulse width modulated (PWM) signal generated by a PWM circuit 107. The PWM circuit 107 (also referred to as a PWM peripheral) is controlled by the CPU 109 and generates a sequence of PWM pulses which, after being processed (e.g., filtered) by the exciting circuit 105, turn into the sine wave signal $V_{in}$.

Still referring to FIG. 1, the output signals 104A and 104B from the resolver 103 are processed by a buffer circuit 119. The buffer circuit 119 performs signal conditioning functions, such as modifying/removing offsets (e.g., DC levels) of the output signals 104A and 104B, and/or voltage conversion. For example, the voltages of the output signals 104A and 104B may have amplitudes between about 17 V and about 20 V. The buffer circuit 119 converts (e.g. scales) the amplitudes of output signals 104A and 104B to a voltage range compatible with an analog-to-digital (ADC) circuit 117, such as between about 3 V and about 5 V. The outputs of the buffer circuit 119 are signals 106A and 106B, which may be scaled versions of the signals 104A and 104B, respectively. In other words, the signal 106A is the signal 104A processed by the buffer circuit 119, and the signal 106B is the signal 104B processed by the buffer circuit 119.

The outputs of the buffer circuit 119 are sent to a resolver decoder 130 (also referred to as a digital resolver decoder, or a resolver decoder circuit). Based on the digital samples of the signals 106A and 106B, the resolver decoder 130 generates an estimated angle Ø of the angle Ø of the motor shaft. As illustrated in FIG. 1, the resolver decoder 130 includes an analog-to-digital converter (ADC) circuit 117, a filter circuit 115, a hardware rectifier 113, and an angle calculation circuit 11. The ADC circuit 117 converts the signals 106A and 106B into digital samples. The filter circuit 115 computes a first weighted sum of the digital samples of the signal 106A over a pre-determined period of time (e.g., a duration of T/2), and computes a second weighted sum of the digital samples of the signal 106B over the pre-determined period of time (e.g., a duration of T/2), where the pre-determined period of time is within the first half or within the second half of a period T of the sine wave signal $\sin(\omega_c t)$. The hardware rectifier 113 adjusts the signs of the first weighted sum and the second weighted sum, depending on whether the pre-determined period of time is within the first half or the second half of the period T of the sine wave signal. The outputs of the hardware rectifier 113 are sent to the angle calculation circuit 111 to obtain an angle Ø as the estimate for the angle Ø of the motor shaft. More details are discussed herein after with reference to FIGS. 4, 5, 6A and 6B.

In some embodiments, the angle calculation circuit 111 is omitted in the resolver decoder 130, and the function of the angle calculation circuit 111 is performed by the CPU 109. In other words, instead of using a dedicated hardware (e.g., the angle calculation circuit 111) to compute the estimated angle Ø, the CPU 109 computes the estimated angle Ø.

In some embodiments, the resolver decoder 130, the CPU 109, the memory module 108, the PWM circuit 107 (if formed), and other peripheral modules of the CPU 109 are integrated onto a same semiconductor substrate as a single semiconductor device 150, which may be referred to as a processor 150, a micro-controller 150 with integrated resolver decoder, or simply a micro-controller 150. Compared with a solution where the resolver decoder 130 is implemented in a dedicated semiconductor device (e.g., an application-specific integrated circuit (ASIC)) and the CPU 109 is implemented in another device, the disclosed micro-controller 150 has the advantage of higher integration density (thus lower cost) for the motor control system 100. Compared with a software solution where CPU 109 implements some or all of the functions of the resolver decoder 130, the disclosed structure of the micro-controller 150 offloads computation intensive tasks (e.g., the tasks of computing the output of the filter circuit 115) to hardware circuits, so the CPU 109 can have more computational resources reserved for other system tasks. As a result, the real-time performance of the motor control system 100 is improved.

Figure 4:
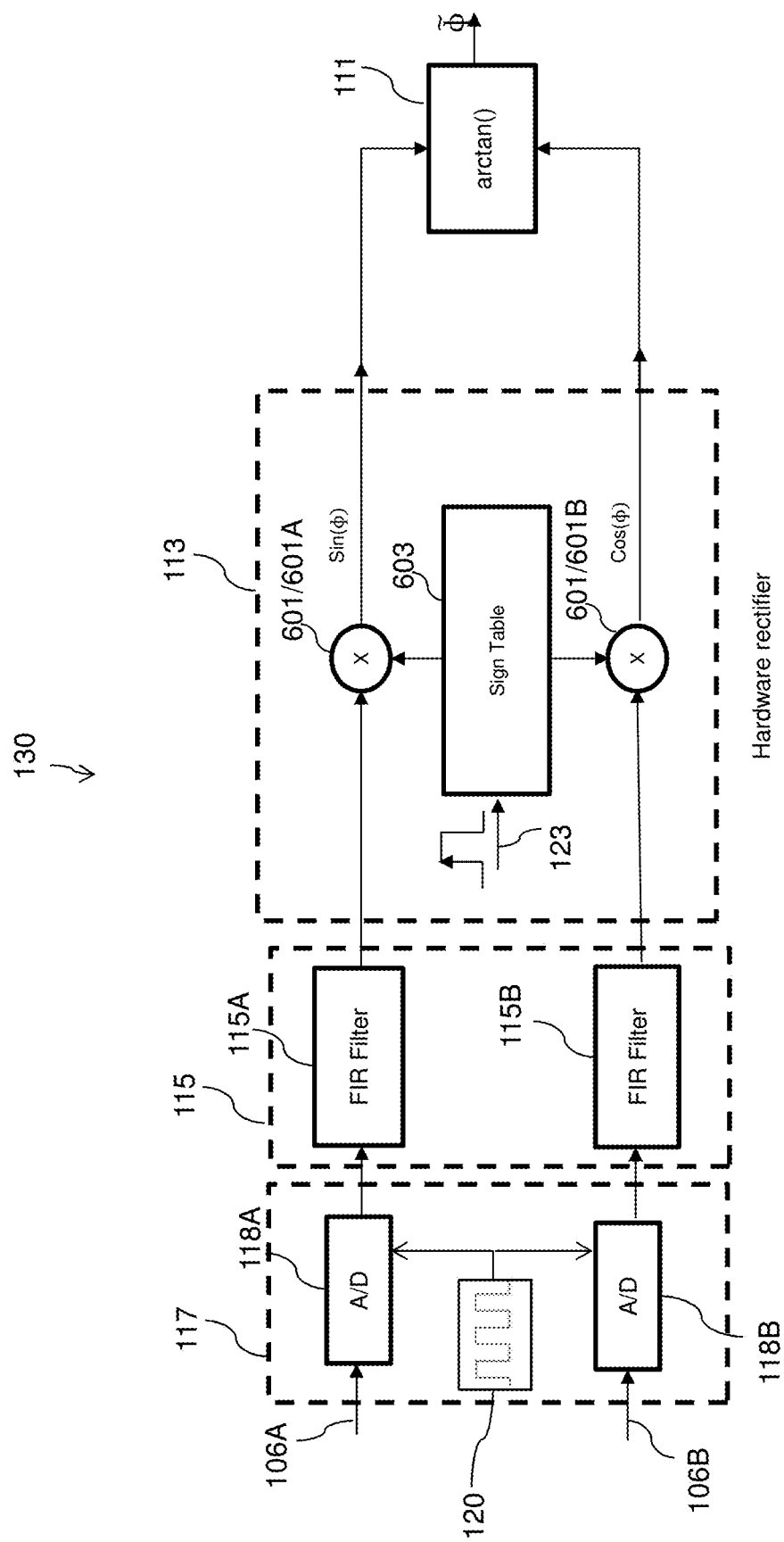
FIG. 4 illustrates a block diagram of a resolver decoder, in an embodiment.

FIG. 4 illustrates a block diagram of a resolver decoder 130, in an embodiment. The resolver decoder 130 of FIG. 4 shows more details than that of FIG. 1, and may be used as the resolver decoder 130 of FIG. 1.

As illustrated in FIG. 4, the signals 106A (e.g., corresponding to the $V_{sin}$ signal) and 106B (e.g., corresponding to the $V_{cos}$ signal) are sent to the ADC circuit 117 for conversion into digital samples. The ADC circuit 117 may include two analog-to-digital converters 118A and 118B, or two input channels 118A and 118B, for converting the signals 106A and 106B synchronously. For example, a same sampling clock signal 120 may be used to drive the circuits (e.g., 118A and 118B) for converting the signals 106A and 106B, such that the signals 106A and 106B are sampled at the same time instants. Therefore, pairs of digital samples of the signals 106A and 106B are sent to the filter circuit 115, where the two digital samples in each pair are sampled at the same time instant.

The filter circuit 115 has two finite impulse response (FIR) filters 115A and 115B. The digital samples of the signal 106A are sent to the FIR filter 115A, and the digital samples of the signal 106B are sent to the FIR filter 115B. Details of the FIR filters 115A and 115B are illustrated in FIG. 5.

Figure 5:
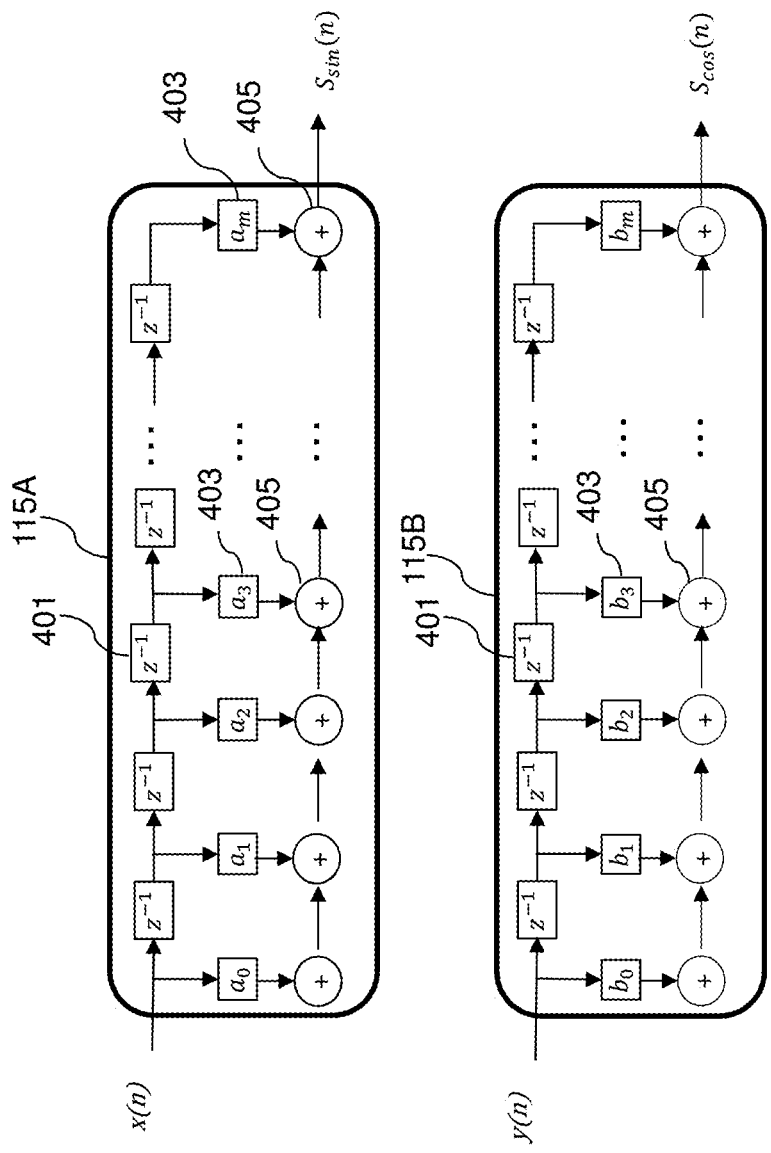
FIG. 5 illustrates a schematic view of the digital filters in a resolver decoder, in an embodiment.

Referring temporarily to FIG. 5, which shows the schematic view of the FIR filters 115A and 115B. As illustrated in FIG. 5, the FIR filter 115A has a tapped-delay line (TDL) with a plurality of delay elements 401, which TDL may be implemented a plurality of serially concatenated memory elements such as flip-flops. The input to the TDL of the FIR filter 115A is x(n), which are the digital samples of the signal 106A. The TDL has a plurality of taps, and each of the taps has a respective coefficient 403 (labeled as $a_k$, k=0, 1, 2, . . . , m), which coefficient is used to scale (e.g., multiply with) the values at the tap. In other words, each coefficient 403 represents a multiplier with a corresponding scaling factor $a_k$. The FIR filter 115A further has a plurality of adders 405, which sums up all the scaled values to generate the output of the FIR filter 115A. Therefore, the FIR filter 115A calculates a weighted sum of the digital samples that are at the input of the TDL and in the delay elements 401. The FIR filter 115B has an identical structure as the FIR filter 115A, but is used to process input data y(n), which are the digital samples of the signal 106B. In addition, the filter coefficients 403 of the FIR filter 115B are denoted as $b_k$, k=0, 1, 2, . . . m, which may be chosen independently from the coefficients $a_k$ of the FIR filter 115A. The output of the FIR filters 115A and 115B are given by:

$$S_{sin}(n) = \sum_{k=0}^{m} a_k x(n-k) \tag{3}$$

$$S_{cos}(n) = \sum_{k=0}^{m} b_k y(n-k) \tag{4}$$

In the illustrated embodiment, the sampling frequency $f_s$ of the ADC circuit 117 is chosen to be orders of magnitude higher (e.g., 10 times, 20 times, 100 times, or more) than that frequency $f_c$ of the sine wave signal $\sin(\omega_c t)$, where $f_c=\omega_c/(2\pi)$. In an example embodiment, the ratio between $f_s$ and $f_c$ is chosen to be 2N, where N is a positive integer (e.g., N≥10), such as 10, 20, or 100. This means that for each period T of the sine wave signal $\sin(\omega_c t)$, 2N digital samples are generated for the signal 106A, and 2N digital samples are generated for the signal 106B. In addition, the number of taps of the FIR filters 115A/115B, which is m+1, is chosen such that the duration of time covered by the TDL of each FIR filter is equal to or smaller than half of the period T, or equivalently, m≤N.

In some embodiments, the filter coefficients $a_k$ and $b_k$ are chosen to be 1, such that the FIR filters 115A and 115B simply calculate the sum of all the digital samples within a duration of $mT_s$, where $T_s=1/f_s$ is the sampling period of the ADC circuit 117. When the oldest digital sample in the TDL (e.g., the digital sample stored in the rightmost delay element 401 of the TDL) of the FIR filter 115A (or 115B) corresponds to a sample of the signal 106A (or 106B) at the starting point (e.g., t=0) of a period T of the sine wave signal $\sin(\omega_c t)$, the output of the FIR filter 115A (or 115B) is the sum of digital samples disposed within the first half of the period T of the sine wave signal. In particular, where m=N, the digital samples stored in the tapped delay line of the FIR filter 115A (or 115B) covers exactly the first half of the period T of the sine wave signal. With the sampling frequency $f_s$ being much higher than the frequency f, of the sine wave signal $\sin(\omega_c t)$, the outputs of the FIR filters 115A and 115B in Equation (3) and (4) provide close approximations to the following integration values, respectively:

$$V_{sin} = \int_0^{T/2} \sin(\omega_c t)\sin(\phi)dt = \int_0^{\pi} \sin(\varphi_c)\sin(\phi)d\varphi_c = \sin(\phi)\int_0^{\pi} \sin(\varphi_c)d\varphi_c \quad (5)$$

$$V_{cos} = \int_0^{T/2} \sin(\omega_c t)\cos(\phi)dt = \int_0^{\pi} \sin(\varphi_c)\cos(\phi)d\varphi_c = \cos(\phi)\int_0^{\pi} \sin(\varphi_c)d\varphi_c \quad (6)$$

For similar reasons, when the oldest digital sample stored in the tapped delay line of the FIR filter 115A (or 115B) corresponds to a sample of the signal 106A (or 106B) at mid-point of the period T (e.g., t=T/2) of the sine wave signal $\sin(\omega_c t)$, the outputs of the filters 115A and 115B in Equation (3) and (4) provide close approximations to the following integration values, respectively:

$$V_{sin} = \int_{T/2}^{T} \sin(\omega_c t)\sin(\phi)dt = \int_{\pi}^{2\pi} \sin(\varphi_c)\sin(\phi)d\varphi_c = \sin(\phi)\int_{\pi}^{2\pi} \sin(\varphi_c)d\varphi_c \quad (7)$$

$$V_{cos} = \int_{T/2}^{T} \sin(\omega_c t)\cos(\phi)dt = \int_{\pi}^{2\pi} \sin(\varphi_c)\cos(\phi)d\varphi_c = \cos(\phi)\int_{\pi}^{2\pi} \sin(\varphi_c)d\varphi_c \quad (8)$$

Note that for simplicity, the integration values in Equations (5) and (6) (and (7) and (8)) omitted a positive constant scale factor, which is determined by, e.g., the positive values A and K in Equations (1) and (2), and the positive scaling factor of the buffer circuit 119. As will be discussed hereinafter, a positive constant scale factor in the integration values in Equations (5) and (6), or (7) and (8), does not change the result of the angle calculation performed later.

Recall that in FIG. 1, the PWM pulses, which is used by the exciting circuit 105 to generate the sine wave signal $\sin(\omega_c t)$, is generated under the control of the CPU 109. Therefore, the timing of the sine wave signal $\sin(\omega_c t)$, such as the starting point (e.g., t=0), the mid-point (e.g., t=T/2), or the end-point (e.g., t=T) of a period T of the sine wave signal $\sin(\omega_c t)$, is known to the CPU 109. In addition, the time delay introduced by the resolver 103, the buffer circuit 119, and the ADC circuit 117 is a fixed value, and is either known or can be measured, e.g., by a calibration process. Therefore, the timing information of the digital samples (also referred to as data samples) fed into the FIR filters 115A/115B, such as which digital sample corresponds to the starting point, the mid-point, or the end-point within a period T of the amplitude-modulated sine wave signal, is known to the CPU 109 (or the PWM circuit 107). For example, the digital samples x(n) and y(n) at the input of the FIR filters 115A/115B that correspond to the starting point of a period T of the amplitude-modulated sine wave signal can be identified by counting a pre-determined number of clock cycles (which correspond to a pre-determined time delay) from the known starting point of the sine wave signal at the output of the exciting circuit 105.

FIG. 1 shows a control signal path 123 from the PWM circuit 107 to the hardware rectifier 113. In some embodiments, the control signal path 123 is used to send the timing information of the data samples, such as a pulse to indicate that the current data sample x(n) and y(n) at the input of the FIR filters 115A/115B are the samples corresponding to the mid-point of a period T, or equivalently, corresponding to an angle T within a period of $2\pi$ of the sine wave signal. The timing formation, such as the pulse discussed above, is used to indicate that the current outputs of the FIR filters 115A/115B correspond to the integration values between angles 0 and $\pi$ (e.g., Equations (5) and (6)), or the integration values between angles T and 27 (e.g., Equations (7) and (8)). Although FIG. 1 shows that the timing information is sent from the PWM circuit 107 to the hardware rectifier 113, the timing information may alternatively be send from the CPU 109 to the hardware rectifier 113.

Note that the integration values $V_{sin}$ and $V_{cos}$ in Equations (5) and (6) provide scaled versions of $\sin(\emptyset)$ and $\cos(\emptyset)$, respectively, scaled by $$\int_0^{\pi} \sin(\varphi_c)d\varphi_c,$$

which has a positive value because $\sin(\varphi_c)$ has positive values for angles between 0 and $\pi$. Similarly, the integration values $V_{sin}$ and $V_{cos}$ in Equations (7) and (8) provide scaled versions of $\sin(\emptyset)$ and $\cos(\emptyset)$, respectively, scaled by $$\int_{\pi}^{2\pi} \sin(\varphi_c)d\varphi_c,$$

which has a negative value because $\sin(\varphi_c)$ has negative values for angles between $\pi$ and $2\pi$. The negative scale factor in the integration values of Equations (7) and (8) may cause error in the calculation of the estimated shaft angle based on $\sin(\emptyset)$ and $\cos(\emptyset)$. Therefore, the integration values of Equations (7) and (8) are adjusted (e.g., corrected) by multiplying with a value of $-1$, or equivalently, by changing (or reversing) the signs of the integration values of Equations (7) and (8), in some embodiments.

Referring back to FIG. 4, the hardware rectifier 113 corrects the outputs of the FIR filters 115A/115B by, e.g., multiplying with a value of $-1$ using the multipliers 601 (e.g., 601A and 601B), when the outputs of the FIR filters 115A/115B correspond to integration values of Equations (7) and (8), or equivalently, when the data samples stored in the tapped delay lines of the FIR filters 115A/115B are data samples in the second half of a period T (e.g., between angles $\pi$ and $2\pi$) of the amplitude-modulated sine wave signal. Conversely, when the outputs of the FIR filters 115A/115B correspond to integration values of Equations (5) and (6), or equivalently, when the data samples stored in the tapped delay lines of the FIR filters 115A/115B are data samples in the first half of a period T (e.g., between angles 0 and $\pi$) of the amplitude-modulated sine wave signal, the hardware rectifier 113 passes through the outputs of the FIR filters 115A/115B, e.g., by multiplying with a value of 1.

The sign table 603 of the hardware rectifier 113 keeps track of the signs of the outputs of the FIR filters 115/117. In other words, the sign table 603 determines whether a multiplication value of 1 or −1 is used to multiply with the outputs of the FIR filters 115A/115B. As discussed above, the control signal path 123 sends timing information of the data samples, or equivalently, timing information regarding whether the outputs of the FIR filters 115A/115B correspond to Equations (5) and (6), or Equations (7) and (8). For example, the control signal path 123 may send a so-called "zero-crossing pulse" once every half of the period T, which zero-crossing pulse indicates whether the current outputs of the FIR filters 115A/115B correspond to Equations (5) and (6), or Equations (7) and (8). In some embodiments, the sign table 603 starts with a multiplication value of 1, and toggles the multiplication value between 1 and −1 each time a zero-crossing pulse is received. Therefore, in the illustrated embodiment, the hardware rectifier 113 multiplies the outputs of the FIR filters 115A/115B with a value of 1 or −1 every half period T, such that the outputs of the hardware rectifier 113 are always the values of sin(Ø) and cos(Ø) scaled by a positive scale factor.

Still referring to FIG. 4, the outputs of the hardware rectifier 113 are sent to the angle calculation circuit 11, which performs an arctangent function and a post processing to find an estimated angle $\tilde{Ø}$ of the angle Ø. In particular, the angle calculation circuit 111 finds a first angle α by $$\alpha = \arctan\left(\frac{\sin(\phi)}{\cos(\phi)}\right) \quad (9)$$

In some embodiments, the arctangent function is implemented as a look-up table (LUT) as a low-cost solution, where the value of sin(Ø)/cos(Ø) is calculated and used as an index of the LUT to find the value of the arctangent function. Note that the angle α calculated by the arctangent function is between −π/2 and π/2, whereas the angle Ø of the motor shaft is between 0 and 2π. A post processing is performed to calculate the estimated angle Ø based on the quadrant of the angle Ø, which is determined by the signs of sin(Ø) and cos(Ø). For example, if, based on the signs of sin(Ø) and cos(Ø), the angle Ø is in the first quadrant, then $\tilde{Ø}$=α; if the angle Ø is in the second quadrant, then $\tilde{Ø}$=π−α; if the angle Ø is in the third quadrant, then $\tilde{Ø}$=π+α; and if the angle Ø is in the fourth quadrant, then $\tilde{Ø}$=2π−α. The estimated angle Ø is then sent to the CPU 109. The CPU 109 may, based on the motor control algorithm, determine the driving voltages for the motor 101, such that the motor 101 is controlled in a closed-loop controlled fashion.

One skilled in the art will readily appreciate that the CPU 109 may generate a sine wave signal that lasts continuously over multiple periods of time during the operation of the motor 101. The above described processing, which generates an estimated angle $\tilde{Ø}$ every half period of the sine wave signal, is performed repeatedly for each period T of the sine wave signal, so that the CPU 109 gets updated estimates of the angle Ø of the motor shaft twice a period of the sine wave signal.

The disclosed FIR filters 115A/115B integrate (e.g., add) the amplitude-modulated sine wave signal over the first half or the second half of a period T of the sine wave signal, which has the advantage of improving the quality (e.g., signal-to-noise ratio (SNR)) of the calculated values for (scaled versions of) sin(Ø) and cos(Ø). This is because in real systems, the output voltage $V_{sin}$ and $V_{cos}$ of the resolver 103 has noises (e.g., random noises), which degrade the quality of the output voltages. The integration operation (see Equations (5) and (6), or (7) and (8)) averages out the random noises, thereby reducing the noise power without adversely affecting the values (sin(Ø) and cos(Ø)) being calculated. Compared with a method where each pair of digital samples from the ADC circuit 117 are used directly to compute the arctangent, the disclosed processing provides significantly improved accuracy in the estimated angle $\tilde{Ø}$.

Figure 6:
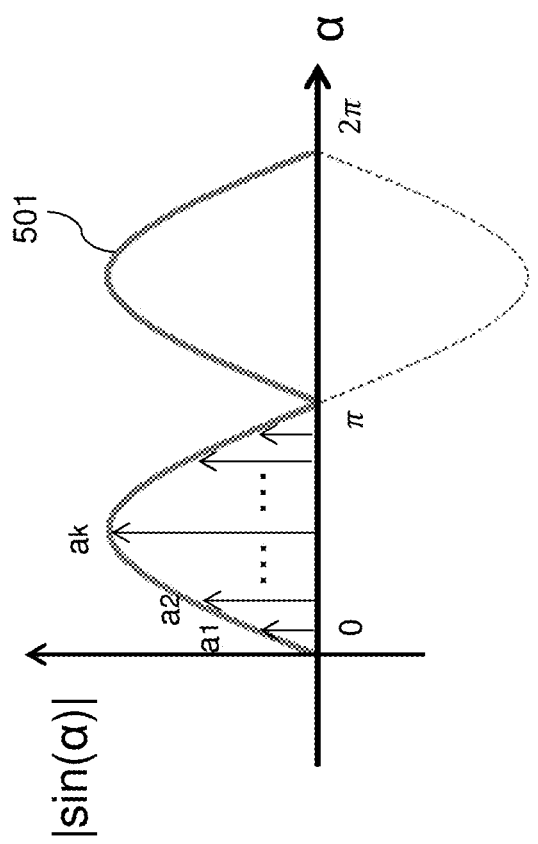
FIG. 6 illustrates a strategy for assigning filter tap coefficients, in an embodiment.

In the discussion above, the coefficients of the FIR filters 115A/115B are set to a value of 1 to simplify the discussion. The coefficients of the FIR filters 115A/115B, however, may be chosen to different values to improve performance. For example, digital samples corresponding to angles proximate to 0, π, and 2π of the sine wave signal has small amplitudes, and due to the random noise in the system, these digital samples have lower quality (e.g., lower SNR) than digital samples corresponding to angles proximate to π/2 or 3π/2. Therefore, it may be advantageous to assign smaller weights (e.g., filter coefficients with smaller values) for the digital samples with lower quality (e.g., near zero-crossing locations of the sine wave signal), and to assign higher weights for the digital samples with higher quality (e.g., near maximum value locations of the sine wave signal). FIG. 6 illustrates a weight assignment strategy that improves the quality of the output of the FIR filters 115A and 115B.

Referring to FIG. 6, the tap coefficients of the FIR filter 115A (or 115B) (see, e.g., $a_1, a_2, \ldots, a_k$ in FIG. 6) are chosen to be equal to, or proportional to, the values of the sine wave signal at locations corresponding to locations of the filter taps. For example, the amplitudes of the tap coefficients follow the envelope of the sine wave signal (e.g., the envelope in half of a period T).

Figure 7A:
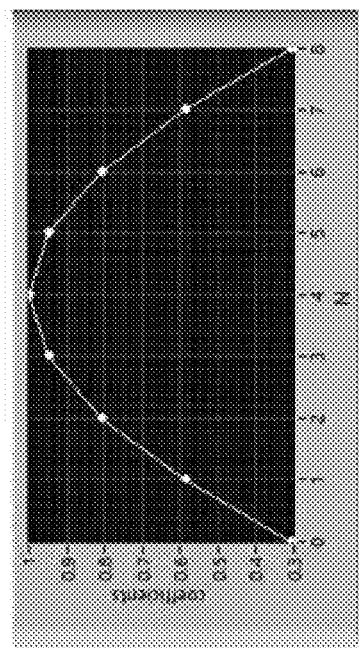
FIGS. 7A and 7B illustrate a strategy for assigning filter tap coefficients, in another embodiment.
Figure 7B:
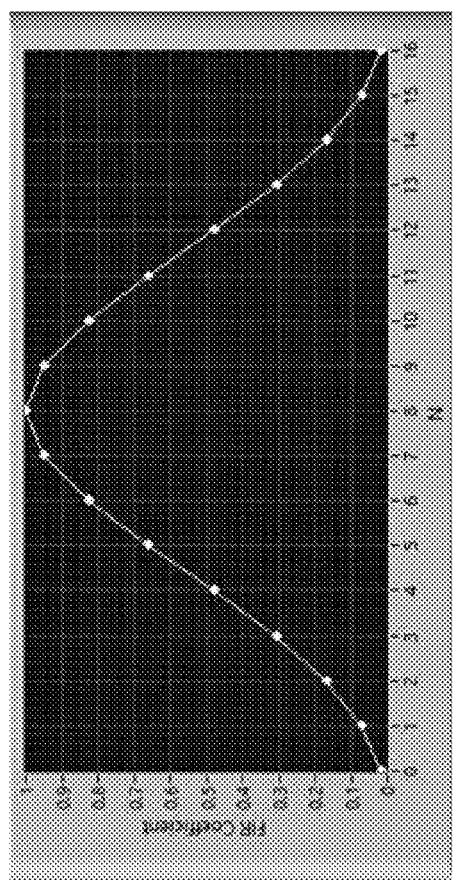

FIGS. 7A and 7B illustrate another strategy for assigning the tap coefficients of the FIR filters 115AA (or 115B). In the example of FIGS. 7A and 7B, the tap coefficients do not follow the envelope of the sine wave signal, but are still larger for digital samples having larger amplitudes for resolver output signal, and smaller for digital samples having smaller amplitudes for resolver output signal. For example, the tap coefficient may be calculated by computing the convolution of a vector A with itself, where the values in the vector A follow the envelope of the sine wave signal (e.g., in half of a period T). FIG. 7A plots an example vector A=[0.309 0.588 0.809 0.951 0.660 0.478 0.308 0.169 0.073 0.019]. The tap coefficient, denoted by a vector B, is the convolution of the vector A with itself (e.g., B=A*A). For the above example vector A, the corresponding tap coefficient B=[0.019 0.073 0.169 0.308 0.478 0.660 0.828 0.951 1.000 0.951 0.828 0.660 0.478 0.308 0.169 0.073 0.019]. FIG. 7B plots the tap coefficients B. It is seen from FIG. 7B that the convolution of such a vector A has a bell shape, which accentuates (e.g., amplifies) the center portion and attenuates (e.g., reduces) the tail portions (e.g., portions at the edges of the bell shape). This further improves the quality of the output of the FIR filters 115A and 115B.

Figure 8:
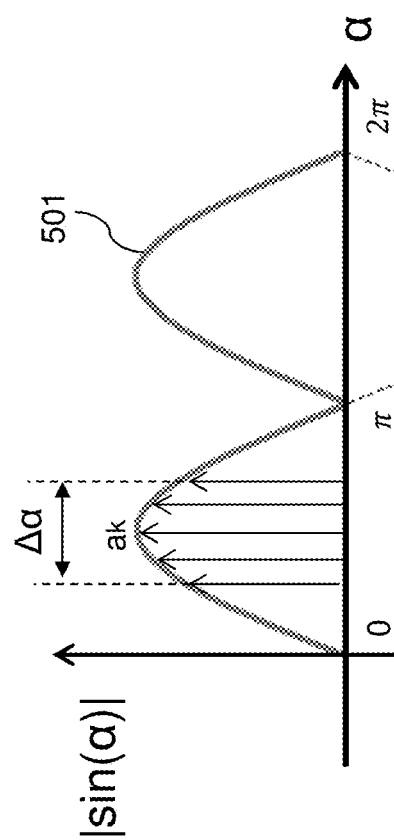
FIG. 8 illustrates a strategy for assigning filter tap coefficients, in yet another embodiment.

FIG. 8 illustrates another tap coefficients assignment strategy. In FIG. 8, only filter taps corresponding to locations around the peak of the sine wave signal (see the center region Aa around the peak of the sine wave signal in FIG. 8) are assigned non-zero values, and filter taps outside the center region (e.g., near zero-crossing locations) are assigned zero values. In other words, only digital samples with high SNRs are used in calculation.

While the integrations in Equations (5) and (6) (or (7) and (8)) are over the entire first half or the entire second half of a period T of the sine wave signal, one skilled in the art will readily appreciate that these are merely non-limiting examples. The integration ranges, or equivalently, the spans of the tapped delay lines in the FIR filters 115A/115B, do not have to cover the entire first half or the entire second half of a period T of the sine wave signal. Instead, the tapped delay lines in the FIR filters 115A/115B may only cover a portion of the first half or the second half of a period T of the sine wave signal.

Figure 9:
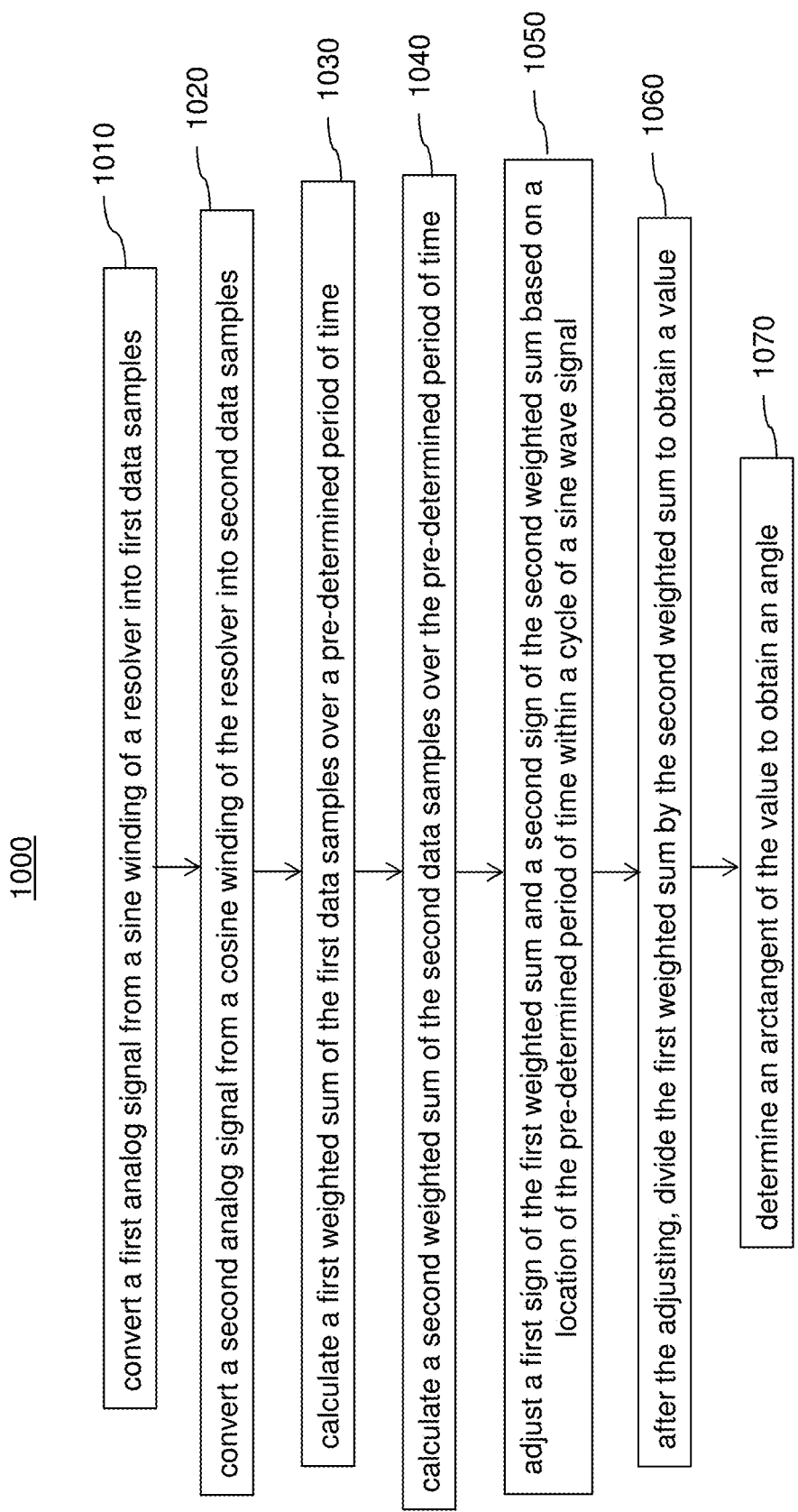
FIG. 9 illustrates a flow chart of a method for operating a resolver decoder circuit, in some embodiments.

FIG. 9 illustrates a flow chart of a method 1000 for operating a resolver decoder circuit, in some embodiments. It should be understood that the embodiment method shown in FIG. 9 is merely an example of many possible embodiment methods. One of ordinary skill in the art would recognize many variations, alternatives, and modifications. For example, various steps as illustrated in FIG. 9 may be added, removed, replaced, rearranged and repeated.

Referring to FIG. 9, at block 1010, a first analog signal is converted from a sine winding of a resolver into first data samples. At block 1020, a second analog signal is converted from a cosine winding of the resolver into second data samples. At block 1030, a first weighted sum of the first data samples is calculated over a pre-determined period of time. At block 1040, a second weighted sum of the second data samples is calculated over the pre-determined period of time. At block 1050, a first sign of the first weighted sum and a second sign of the second weighted sum are adjusted based on a location of the pre-determined period of time within a cycle of a sine wave signal. At block 1060, after the adjusting, the first weighted sum is divided by the second weighted sum to obtain a value. At block 1070, an arctangent of the value is determined to obtain an angle.

Disclosed embodiments may achieve advantages. For example, the filter circuit 115 calculates weighted sums of the output signals from the resolver 103 to obtain scaled versions of sin(Ø) and cos(Ø). The averaging effect of the filter circuit 115 reduces noise in the output of the filter circuit 115, thus improving estimates of the angle of the motor shaft. In addition, the filter coefficients may be assigned to follow the amplitude of the sine wave signal, thereby assigning higher weights to resolver output signals with larger amplitudes. This also improves the accuracy of the estimate of the angle of the motor shaft. By performing the integration operation over a duration within half of a period T of the sine wave signal, the sign of the output of the integration operation can be easily adjusted by the hardware rectifier 113. Compared with an integration over the full period T where each of the data samples in the second half of the period T needs to be multiplied with −1, the disclosed structure allows a low complexity hardware rectifier 113 to be used. The disclosed resolver decoder 130 provides a low-cost, hardware solution that can be integrated with the CPU 109. The hardware resolver decoder 130 performs computational intensive operations such as the FIR filtering, which offloads these tasks from the CPU 109 such that the real-time performance of the motor control system is improved.

Example embodiments of the present invention are summarized here. Other embodiments can also be understood from the entirety of the specification and the claims filed herein.

Example 1. In an embodiment, a resolver decoder circuit includes: a first filter circuit configured to calculate a first weighted sum of a first digital signal over a pre-determined period of time, wherein the first digital signal comprises first digital samples of a first analog signal from a first secondary winding of a resolver; a second filter circuit configured to calculate a second weighted sum of a second digital signal over the pre-determined period of time, wherein the second digital signal comprises second digital samples of a second analog signal from a second secondary winding of the resolver, wherein the first analog signal and the second analog signal are configured to be induced by a sine wave signal applied to an input winding of the resolver; and a rectifier configured to generate a first output and a second output by adjusting a first sign of the first weighted sum and adjusting a second sign of the second weighted sum, respectively.

Example 2. The resolver decoder circuit of Example 1, wherein the rectifier has an input terminal configured to receive a control signal that indicates whether the pre-determined period of time corresponds to a first half of a period of the sine wave signal or a second half of a period of the sine wave signal.

Example 3. The resolver decoder circuit of Example 2, wherein the rectifier is configured to: reversing the first sign of the first weighted sum and the second sign of the second weighted sum when the control signal indicates that the pre-determined period of time corresponds to the second half of a period of the sine wave signal; and keeping the first sign of the first weighted sum and the second sign of the second weighted sum unchanged when the pre-determined period of time corresponds to the first half of a period of the sine wave signal.

Example 4. The resolver decoder circuit of Example 1, further comprising an analog-to-digital converter (ADC) circuit, wherein the ADC circuit is configured to sample the first analog signal and the second analog signal using a same sampling clock signal.

Example 5. The resolver decoder circuit of Example 1, further comprising an angle calculation circuit, wherein the angle calculation circuit is configured to: calculate a ratio between the first output of the rectifier and the second output of the rectifier; and determine a first angle by performing an arctangent function on the ratio.

Example 6. The resolver decoder circuit of Example 5, wherein the first secondary winding of the resolver is a sine winding, and the second secondary winding of the resolver is a cosine winding.

Example 7. The resolver decoder circuit of Example 5, wherein the angle calculation circuit is further configured to: determine, based on signs of the first output and the second output of the rectifier, a quadrant of an angle indicated by the first analog signal and the second analog signal; and determine the angle indicated by the first analog signal and the second analog signal by adjusting the first angle based on the determined quadrant.

Example 8. The resolver decoder circuit of Example 1, wherein each of the first filter circuit and the second filter circuit comprises: an input terminal; an output terminal; a tapped delay line (TDL) coupled to the input terminal and having taps, wherein each of the taps of the TDL has a respective weight factor; and a plurality of adders configured to generate, at the output terminal, a weighted sum of digital values at the taps of the TDL.

Example 9. The resolver decoder circuit of Example 8, wherein the weight factors of the TDL are equal.

Example 10. The resolver decoder circuit of Example 8, wherein the weight factors of the TDL are different.

Example 11. The resolver decoder circuit of Example 10, wherein amplitudes of the weight factors of the TDL follow an envelope of the sine wave signal.

Example 12. In an embodiment, a processor having an integrated resolver decoder circuit includes: an analog-to-digital converter (ADC) circuit configured to: generate first digital samples by converting a first analog signal from a sine winding of a resolver, and generate second digital samples by converting a second analog signal from a cosine winding of the resolver, the first analog signal and the second analog signal being generated by exciting an input winding of the resolver with a sine wave signal; a first tapped delay line (TDL) filter coupled to the ADC circuit and configured to calculate a first weighted sum of the first digital samples over a pre-determined period of time; a second TDL filter coupled to the ADC circuit and configured to calculate a second weighted sum of the second digital samples over the pre-determined period of time; a rectifier configured to generate a first output and a second output by adjusting a first sign of the first weighted sum and a second sign of the second weighted sum, respectively; and a central processing unit (CPU) coupled to the rectifier.

Example 13. The processor of Example 12, wherein the rectifier is configured to adjust the first sign of the first weighted sum and the second sign of the second weighted sum by: reversing the first sign of the first weighted sum and the second sign of the second weighted sum if the sine wave signal has negative values during the pre-determined period of time; and keeping the first sign of the first weighted sum and the second sign of the second weighted sum unchanged if the sine wave signal has positive values during the pre-determined period of time.

Example 14. The processor of Example 12, wherein the ADC circuit is configured to generate the first digital samples and the second digital samples synchronously.

Example 15. The processor of Example 12, wherein the first TDL filter has first weight factors for scaling the first digital samples at first time instants within the pre-determined period of time, wherein at least some of the first weight factors are proportional to amplitudes of the sine wave signal at the first time instants within the pre-determined period of time.

Example 16. The processor of Example 12, wherein the CPU is configured to: determine a quadrant of an angle indicated by the first analog signal and the second analog signal based on the first output and the second output of the rectifier; divide the first output of the rectifier by the second output of the rectifier to obtain a first value; perform an arctangent function on the first value to obtain a first angle; and adjust the first angle based on the determined quadrant to obtain an estimate of the angle indicated by the first analog signal and the second analog signal.

Example 17. The processor of Example 16, wherein the CPU is configured to perform the arctangent function using a look-up table.

Example 18. In an embodiment, a method of operating a resolver decoder circuit includes: converting a first analog signal from a sine winding of a resolver into first data samples; converting a second analog signal from a cosine winding of the resolver into second data samples; calculating a first weighted sum of the first data samples over a pre-determined period of time; calculating a second weighted sum of the second data samples over the pre-determined period of time; adjusting a first sign of the first weighted sum and a second sign of the second weighted sum based on a location of the pre-determined period of time within a cycle of a sine wave signal; after the adjusting, dividing the first weighted sum by the second weighted sum to obtain a value; and determining an arctangent of the value to obtain an angle.

Example 19. The method of Example 18, wherein adjusting the first sign of the first weighted sum and the second sign of the second weighted sum comprises: reversing the first sign of the first weighted sum and the second sign of the second weighted sum when the pre-determined period of time is within a second half of the cycle of the sine wave signal; and keeping the first sign of the first weighted sum and the second sign of the second weighted sum unchanged when the pre-determined period of time is within a first half of the cycle of the sine wave signal.

Example 20. The method of Example 18, wherein the first analog signal and the second analog signal are converted into digital samples synchronously using an analog-to-digital converter circuit.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A resolver decoder circuit comprising:
a first filter circuit configured to calculate a first weighted sum of a first digital signal over a pre-determined period of time, wherein the first digital signal comprises first digital samples of a first analog signal from a first secondary winding of a resolver;
a second filter circuit configured to calculate a second weighted sum of a second digital signal over the pre-determined period of time, wherein the second digital signal comprises second digital samples of a second analog signal from a second secondary winding of the resolver, wherein the first analog signal and the second analog signal are configured to be induced by a sine wave signal applied to an input winding of the resolver; and
a rectifier configured to generate a first output and a second output by adjusting a first sign of the first weighted sum and adjusting a second sign of the second weighted sum, respectively.

2. The resolver decoder circuit of claim 1, wherein the rectifier has an input terminal configured to receive a control signal that indicates whether the pre-determined period of time corresponds to a first half of a period of the sine wave signal or a second half of a period of the sine wave signal.

3. The resolver decoder circuit of claim 2, wherein the rectifier is configured to:
reversing the first sign of the first weighted sum and the second sign of the second weighted sum when the control signal indicates that the pre-determined period of time corresponds to the second half of a period of the sine wave signal; and
keeping the first sign of the first weighted sum and the second sign of the second weighted sum unchanged when the pre-determined period of time corresponds to the first half of a period of the sine wave signal.

4. The resolver decoder circuit of claim 1, further comprising an analog-to-digital converter (ADC) circuit, wherein the ADC circuit is configured to sample the first analog signal and the second analog signal using a same sampling clock signal.

5. The resolver decoder circuit of claim 1, further comprising an angle calculation circuit, wherein the angle calculation circuit is configured to:
calculate a ratio between the first output of the rectifier and the second output of the rectifier; and
determine a first angle by performing an arctangent function on the ratio.

6. The resolver decoder circuit of claim 5, wherein the first secondary winding of the resolver is a sine winding, and the second secondary winding of the resolver is a cosine winding.

7. The resolver decoder circuit of claim 5, wherein the angle calculation circuit is further configured to:
determine, based on signs of the first output and the second output of the rectifier, a quadrant of an angle indicated by the first analog signal and the second analog signal; and
determine the angle indicated by the first analog signal and the second analog signal by adjusting the first angle based on the determined quadrant.

8. The resolver decoder circuit of claim 1, wherein each of the first filter circuit and the second filter circuit comprises:
an input terminal;
an output terminal;
a tapped delay line (TDL) coupled to the input terminal and having taps, wherein each of the taps of the TDL has a respective weight factor; and
a plurality of adders configured to generate, at the output terminal, a weighted sum of digital values at the taps of the TDL.

9. The resolver decoder circuit of claim 8, wherein the weight factors of the TDL are equal.

10. The resolver decoder circuit of claim 8, wherein the weight factors of the TDL are different.

11. The resolver decoder circuit of claim 10, wherein amplitudes of the weight factors of the TDL follow an envelope of the sine wave signal.

12. A processor having an integrated resolver decoder circuit, the processor comprising:
an analog-to-digital converter (ADC) circuit configured to:
generate first digital samples by converting a first analog signal from a sine winding of a resolver, and
generate second digital samples by converting a second analog signal from a cosine winding of the resolver, the first analog signal and the second analog signal being generated by exciting an input winding of the resolver with a sine wave signal;
a first tapped delay line (TDL) filter coupled to the ADC circuit and configured to calculate a first weighted sum of the first digital samples over a pre-determined period of time;
a second TDL filter coupled to the ADC circuit and configured to calculate a second weighted sum of the second digital samples over the pre-determined period of time;
a rectifier configured to generate a first output and a second output by adjusting a first sign of the first weighted sum and a second sign of the second weighted sum, respectively; and
a central processing unit (CPU) coupled to the rectifier.

13. The processor of claim 12, wherein the rectifier is configured to adjust the first sign of the first weighted sum and the second sign of the second weighted sum by:
reversing the first sign of the first weighted sum and the second sign of the second weighted sum if the sine wave signal has negative values during the pre-determined period of time; and
keeping the first sign of the first weighted sum and the second sign of the second weighted sum unchanged if the sine wave signal has positive values during the pre-determined period of time.

14. The processor of claim 12, wherein the ADC circuit is configured to generate the first digital samples and the second digital samples synchronously.

15. The processor of claim 12, wherein the first TDL filter has first weight factors for scaling the first digital samples at first time instants within the pre-determined period of time, wherein at least some of the first weight factors are proportional to amplitudes of the sine wave signal at the first time instants within the pre-determined period of time.

16. The processor of claim 12, wherein the CPU is configured to:
determine a quadrant of an angle indicated by the first analog signal and the second analog signal based on the first output and the second output of the rectifier;
divide the first output of the rectifier by the second output of the rectifier to obtain a first value;
perform an arctangent function on the first value to obtain a first angle; and
adjust the first angle based on the determined quadrant to obtain an estimate of the angle indicated by the first analog signal and the second analog signal.

17. The processor of claim 16, wherein the CPU is configured to perform the arctangent function using a look-up table.

18. A method of operating a resolver decoder circuit, the method comprising:
converting a first analog signal from a sine winding of a resolver into first data samples;
converting a second analog signal from a cosine winding of the resolver into second data samples;
calculating a first weighted sum of the first data samples over a pre-determined period of time;
calculating a second weighted sum of the second data samples over the pre-determined period of time;
adjusting a first sign of the first weighted sum and a second sign of the second weighted sum based on a location of the pre-determined period of time within a cycle of a sine wave signal;
after the adjusting, dividing the first weighted sum by the second weighted sum to obtain a value; and
determining an arctangent of the value to obtain an angle.

19. The method of claim 18, wherein adjusting the first sign of the first weighted sum and the second sign of the second weighted sum comprises:
reversing the first sign of the first weighted sum and the second sign of the second weighted sum when the pre-determined period of time is within a second half of the cycle of the sine wave signal; and
keeping the first sign of the first weighted sum and the second sign of the second weighted sum unchanged when the pre-determined period of time is within a first half of the cycle of the sine wave signal.

20. The method of claim 18, wherein the first analog signal and the second analog signal are converted into digital samples synchronously using an analog-to-digital converter circuit.

* * * * *